US012701103B2

(12) United States Patent
Zhong et al.

(10) Patent No.: US 12,701,103 B2
(45) Date of Patent: Aug. 4, 2026

(54) APPLICATION CONTEXT VIA ENDPOINT-AWARE TRAFFIC FOR ENHANCED SECURITY

(71) Applicant: Palo Alto Networks, Inc., Santa Clara, CA (US)

(72) Inventors: Rui Zhong, Sunnyvale, CA (US); Jiangnan Li, Santa Clara, CA (US); Amy Lee, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 154 days.

(21) Appl. No.: 18/884,844

(22) Filed: Sep. 13, 2024

(65) Prior Publication Data

US 2026/0081893 A1    Mar. 19, 2026

(51) Int. Cl.
*H04L 29/06* (2006.01)
*H04L 9/40* (2022.01)

(52) U.S. Cl.
CPC .......... *H04L 63/0263* (2013.01); *H04L 63/20* (2013.01)

(58) Field of Classification Search
CPC ............................ H04L 63/0263; H04L 63/20
See application file for complete search history.

(56) References Cited

U.S. PATENT DOCUMENTS

| | | | |
|---|---|---|---|
| 6,772,332 | B1 | 8/2004 | Boebert |
| 7,089,592 | B2 | 8/2006 | Adjaoute |
| 7,386,889 | B2 | 6/2008 | Shay |
| 7,747,730 | B1 | 6/2010 | Harlow |
| 7,801,518 | B1 | 9/2010 | Urbanek |
| 7,930,746 | B1 | 4/2011 | Sheleheda |
| 7,958,228 | B2 | 6/2011 | Riise |
| 8,131,851 | B2 | 3/2012 | Harlow |
| 8,365,276 | B1 | 1/2013 | Sallam |
| 8,418,249 | B1 | 4/2013 | Nucci |
| 9,043,905 | B1 | 5/2015 | Allen |
| 9,348,985 | B2 | 5/2016 | Davis |

(Continued)

FOREIGN PATENT DOCUMENTS

| | | |
|---|---|---|
| CN | 102918801 | 5/2016 |
| CN | 103765846 | 8/2017 |
| WO | 2014138115 | 9/2014 |

OTHER PUBLICATIONS

Author Unknown, Malware Traffic Analysis, https://blog.brillantit.com/, CryptoWall 3.0 Traffic Analysis, Oct. 29, 2015.

(Continued)

*Primary Examiner* — Mahfuzur Rahman
(74) *Attorney, Agent, or Firm* — Van Pelt, Yi & James LLP

(57) ABSTRACT

Techniques for providing application context via endpoint-aware traffic for enhanced security are disclosed. In some embodiments, a system/process/computer program product for providing application context via endpoint-aware traffic for enhanced security includes collecting process information for a process at an endpoint; injecting the process information as metadata into network traffic associated with the process to generate endpoint-aware traffic; and processing the endpoint-aware traffic at a security platform or a security service to access more comprehensive information about the endpoint environment to apply a security policy based on a contextual application identifier (App-ID).

21 Claims, 7 Drawing Sheets

102

(56) References Cited

U.S. PATENT DOCUMENTS

| | | | | |
|---|---|---|---|---|
| 9,648,035 | B2 | 5/2017 | Basavapatna | |
| 10,572,823 | B1 | 2/2020 | Feinman | |
| 11,153,444 | B2 * | 10/2021 | Xu | H04M 15/61 |
| 11,616,761 | B2 | 3/2023 | Lam | |
| 2002/0087882 | A1 | 7/2002 | Schneier | |
| 2003/0084323 | A1 | 5/2003 | Gales | |
| 2007/0058551 | A1 | 3/2007 | Brusotti | |
| 2007/0192865 | A1 | 8/2007 | Mackin | |
| 2007/0195753 | A1 | 8/2007 | Judge | |
| 2007/0199061 | A1 | 8/2007 | Byres | |
| 2007/0206741 | A1 | 9/2007 | Tiliks | |
| 2007/0294369 | A1 | 12/2007 | Ginter et al. | |
| 2008/0047009 | A1 | 2/2008 | Overcash | |
| 2008/0175226 | A1 | 7/2008 | Alperovitch | |
| 2009/0178139 | A1 | 7/2009 | Stute | |
| 2010/0192225 | A1 | 7/2010 | Ma | |
| 2011/0238979 | A1 | 9/2011 | Harp | |
| 2012/0304277 | A1 | 11/2012 | Li | |
| 2013/0019314 | A1 | 1/2013 | Ji | |
| 2013/0083701 | A1 | 4/2013 | Tomic | |
| 2013/0291099 | A1 | 10/2013 | Donfried | |
| 2013/0298244 | A1 | 11/2013 | Kumar | |
| 2015/0103136 | A1 | 4/2015 | Anderson | |
| 2015/0288709 | A1 | 10/2015 | Singhal | |
| 2016/0142435 | A1 | 5/2016 | Bernstein | |
| 2016/0164893 | A1 | 6/2016 | Levi | |
| 2016/0191563 | A1 | 6/2016 | Beauchesne | |
| 2016/0359889 | A1 | 12/2016 | Yadav | |
| 2017/0053120 | A1 | 2/2017 | Kamble | |
| 2017/0099278 | A1 | 4/2017 | Ducatel | |
| 2017/0103215 | A1 | 4/2017 | Mahaffey | |
| 2017/0118228 | A1 | 4/2017 | Cp | |
| 2017/0163666 | A1 | 6/2017 | Venkatramani | |
| 2017/0235967 | A1 | 8/2017 | Ray | |
| 2017/0237762 | A1 | 8/2017 | Ogawa | |
| 2017/0279819 | A1 | 9/2017 | More | |
| 2019/0052659 | A1 | 2/2019 | Weingarten | |
| 2019/0081983 | A1 | 3/2019 | Teal | |
| 2020/0322230 | A1 * | 10/2020 | Natal | H04L 67/51 |
| 2021/0227438 | A1 * | 7/2021 | Xu | H04W 8/18 |
| 2023/0135699 | A1 * | 5/2023 | Liao | H04W 4/50 |
| | | | | 370/252 |
| 2024/0154883 | A1 * | 5/2024 | Li | H04L 47/2483 |
| 2024/0187340 | A1 * | 6/2024 | Ding | H04L 45/655 |
| 2024/0276290 | A1 * | 8/2024 | Bangolae | G06F 9/4843 |
| 2025/0323950 | A1 * | 10/2025 | Avula | H04W 12/069 |
| 2025/0351008 | A1 * | 11/2025 | Marquezan | H04L 41/0893 |

OTHER PUBLICATIONS

Author Unknown, Threat Analytics Platform, Gurducul Predictive Security Analytics, downloaded from gurucul.com_wp-content_uploads_2015_04_TAP on May 20, 2015.

Cappelli et al., Common Sense Guide to Prevention and Detection of Insider Threats, 3rd Edition, Version 3.1, CyLab, Jan. 2009.

Dan Cybulski, Palo Alto Networks Uses Neural Networks to Attack Insider Threat, Apr. 9, 2015.

Darren Manners, The User Agent Field: Analyzing and Detecting the Abnormal or Malicious in your Organization, published Oct. 20, 2011, retrieved From https://www.sans.org/reading-room/whitepapers/malicious/user-agent-field-analyzing-detecting- abnormal-malicious-organization-33874.

Freiling et al., Botnet tracking: Exploring a Root-Cause Methodology to Prevent Distributed Denial-Of-Service Attacks, Retrieved from http://link.springer.com/chapter/10.1007%2F11555827_19, European Symposium on Research in Computer Security. Springer Berlin Heidelberg, 2005.

Greitzer et al., Predictive Modeling for Insider Threat Mitigation, Pacific Northwest National Laboratory, Apr. 2009.

Microsoft, Security Monitoring and Attack Detection, Microsoft MSDN Library, published Aug. 29, 2006, Retrieved From https://msdn.microsoft.com/en-us/library/cc875806.aspx.

Schnackengerg et al., Cooperative Intrusion Traceback and Response Architecture (CITRA), Retrieved from http://ieeexplore.ieee.org/stamp/stamp.jsp?arnumber=932192, DARPA Information Survivability Conference & Exposition II, 2001. DISCEX'01. Proceedings. vol. 1. IEEE, 2001.

Silowash et al., Insider Threat Control: Understanding Data Loss Prevention (DLP) and Detection by Correlating Events from Multiple Sources, Software Engineering Institute, Carnegie Mellon, Jan. 2013.

Stiawan et al., Characterizing Network Intrusion Prevention System, International Journal of Computer Applications, vol. 14, Jan. 2011.

Tim Treat, What We Learn From Protecting Artificially Intelligent Cars, Palo Alto Networks, Sep. 5, 2014.

Warkentin et al., Behavioral and Policy Issues in Information Systems Security: The Insider Threat, European Journal of Information Systems, Apr. 2009.

* cited by examiner

```
> show group session all:
C:\Users\zr33\AppData\Local\slack\app-4.35.131\slack.exe(7692):
    id: 72080, port: 50370, dst_ip: 104.123.70.184, proto: 6, app: slack-base
    id: 72097, port: 50375, dst_ip: 54.71.95.193, proto: 6, app: ssl
    id: 72077, port: 50369, dst_ip: 54.236.104.103, proto: 6, app: ssl
    id: 72067, port: 50363, dst_ip: 54.71.95.193, proto: 6, app: ssl
    id: 72073, port: 50367, dst_ip: 54.71.95.193, proto: 6, app: ssl
    id: 72068, port: 50364, dst_ip: 54.71.95.193, proto: 6, app: slack-base
    id: 72086, port: 50374, dst_ip: 52.13.138.150, proto: 6, app: ssl C:\Users\zr33\AppData\Local\Programs\Microsoft VS Code\Code.exe(1920):
    id: 72045, port: 50346, dst_ip: 13.89.179.10, proto: 6, app: ssl C:\Program Files\Tencent\WeChat\WeChat.exe(3244):
    id: 72061, port: 50359, dst_ip: 43.153.248.120, proto: 6, app: wechat-base
    id: 72058, port: 50356, dst_ip: 43.153.248.120, proto: 6, app: wechat-base
    id: 72059, port: 50357, dst_ip: 203.205.232.101, proto: 6, app: wechat-base
    id: 72051, port: 50352, dst_ip: 43.130.30.185, proto: 6, app: unknown-tcp
    id: 72057, port: 50355, dst_ip: 43.129.255.26, proto: 6, app: wechat-base
    id: 72060, port: 50358, dst_ip: 43.129.255.26, proto: 6, app: wechat-base
    id: 72062, port: 50360, dst_ip: 43.129.255.26, proto: 6, app: wechat-base
    id: 72056, port: 50354, dst_ip: 203.205.232.101, proto: 6, app: wechat-base C:\Users\zr33\AppData\Roaming\Zoom\bin\Zoom.exe(8452):
    id: 59851, port: 52403, dst_ip: 52.84.151.43, proto: 17, app: quic
    id: 59837, port: 57869, dst_ip: 144.195.33.167, proto: 6, app: zoom-base
    id: 59842, port: 50671, dst_ip: 144.195.33.167, proto: 17, app: zoom-meeting
    id: 59844, port: 50673, dst_ip: 144.195.33.167, proto: 17, app: zoom-meeting
    id: 59799, port: 57841, dst_ip: 170.114.11.105, proto: 6, app: zoom-base
    id: 59818, port: 57856, dst_ip: 170.114.3.114, proto: 6, app: zoom-base
    id: 59840, port: 50669, dst_ip: 144.195.33.167, proto: 17, app: zoom-meeting
    id: 59864, port: 57882, dst_ip: 170.114.15.103, proto: 6, app: zoom-base
```

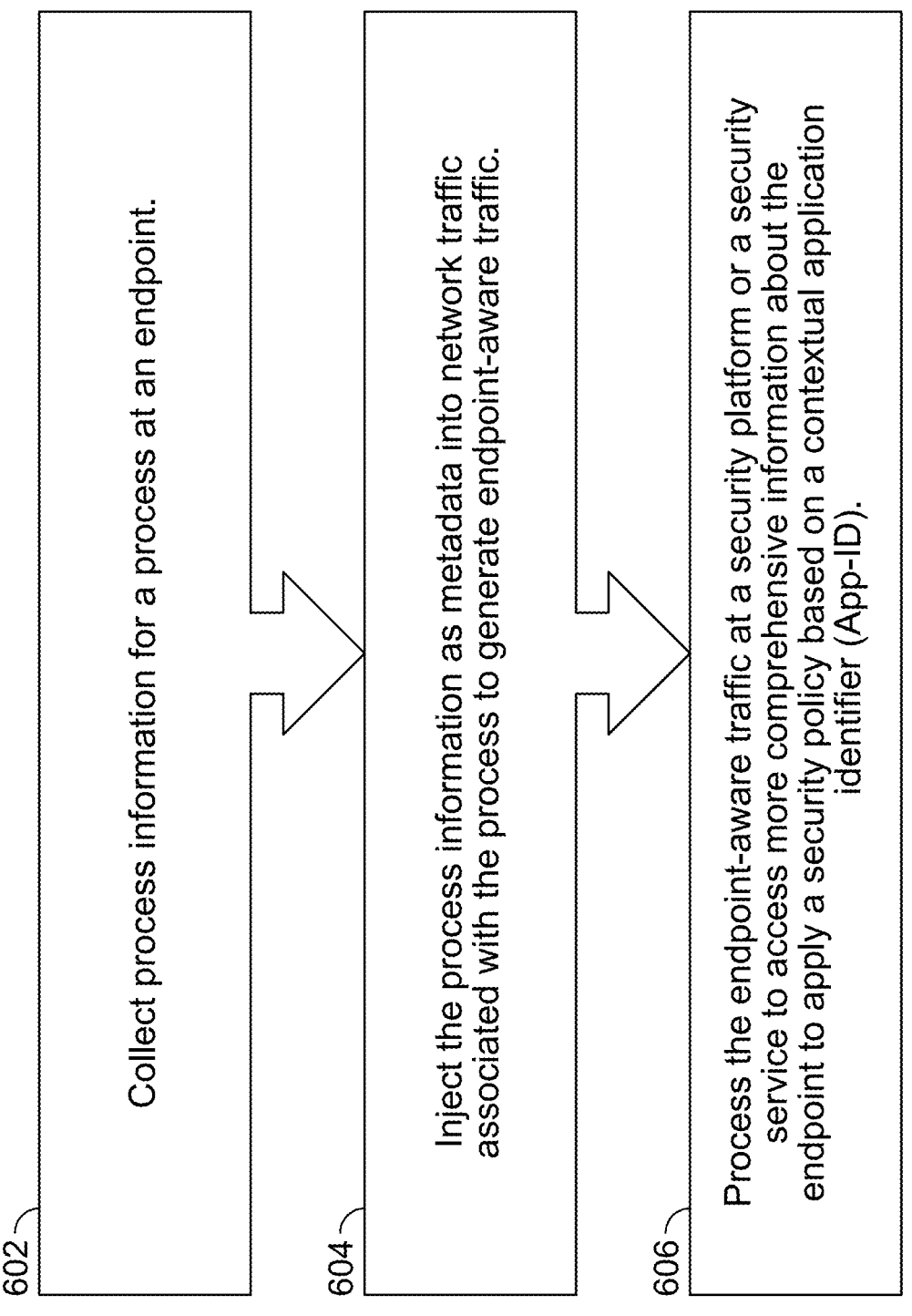

602   Collect process information for a process at an endpoint.

604   Inject the process information as metadata into network traffic associated with the process to generate endpoint-aware traffic.

606   Process the endpoint-aware traffic at a security platform or a security service to access more comprehensive information about the endpoint to apply a security policy based on a contextual application identifier (App-ID).

FIG. 6

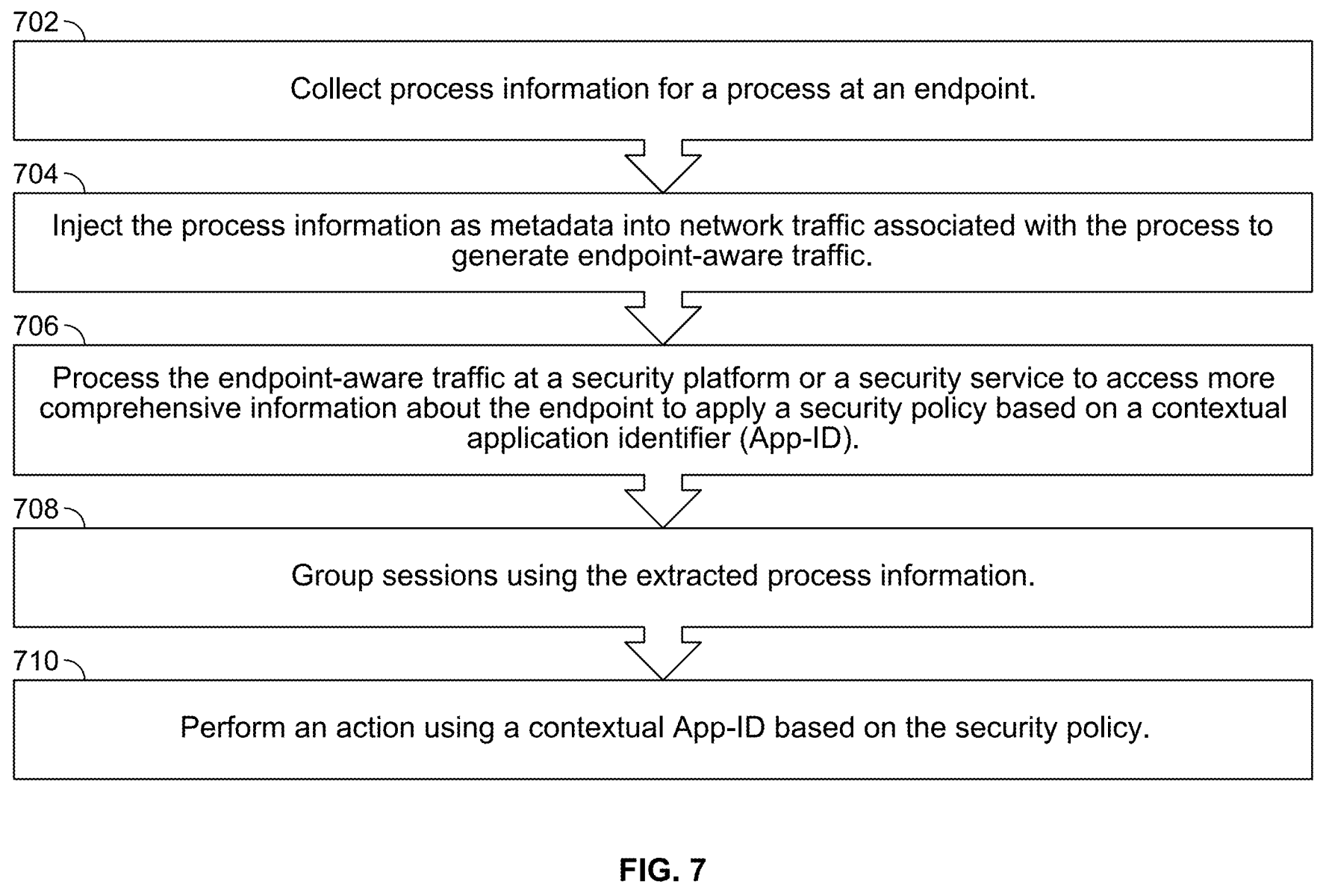

702 — Collect process information for a process at an endpoint.

704 — Inject the process information as metadata into network traffic associated with the process to generate endpoint-aware traffic.

706 — Process the endpoint-aware traffic at a security platform or a security service to access more comprehensive information about the endpoint to apply a security policy based on a contextual application identifier (App-ID).

708 — Group sessions using the extracted process information.

710 — Perform an action using a contextual App-ID based on the security policy.

FIG. 7

APPLICATION CONTEXT VIA ENDPOINT-AWARE TRAFFIC FOR ENHANCED SECURITY

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 5 is an example grouping of sessions using collected process information for providing application context via endpoint-aware traffic for enhanced security in accordance with some embodiments.

FIG. 6 is a flow diagram for a process for providing application context via endpoint-aware traffic for enhanced security in accordance with some embodiments.

FIG. 7 is another flow diagram for a process for providing application context via endpoint-aware traffic for enhanced security in accordance with some embodiments.

DETAILED DESCRIPTION

Figure 1:
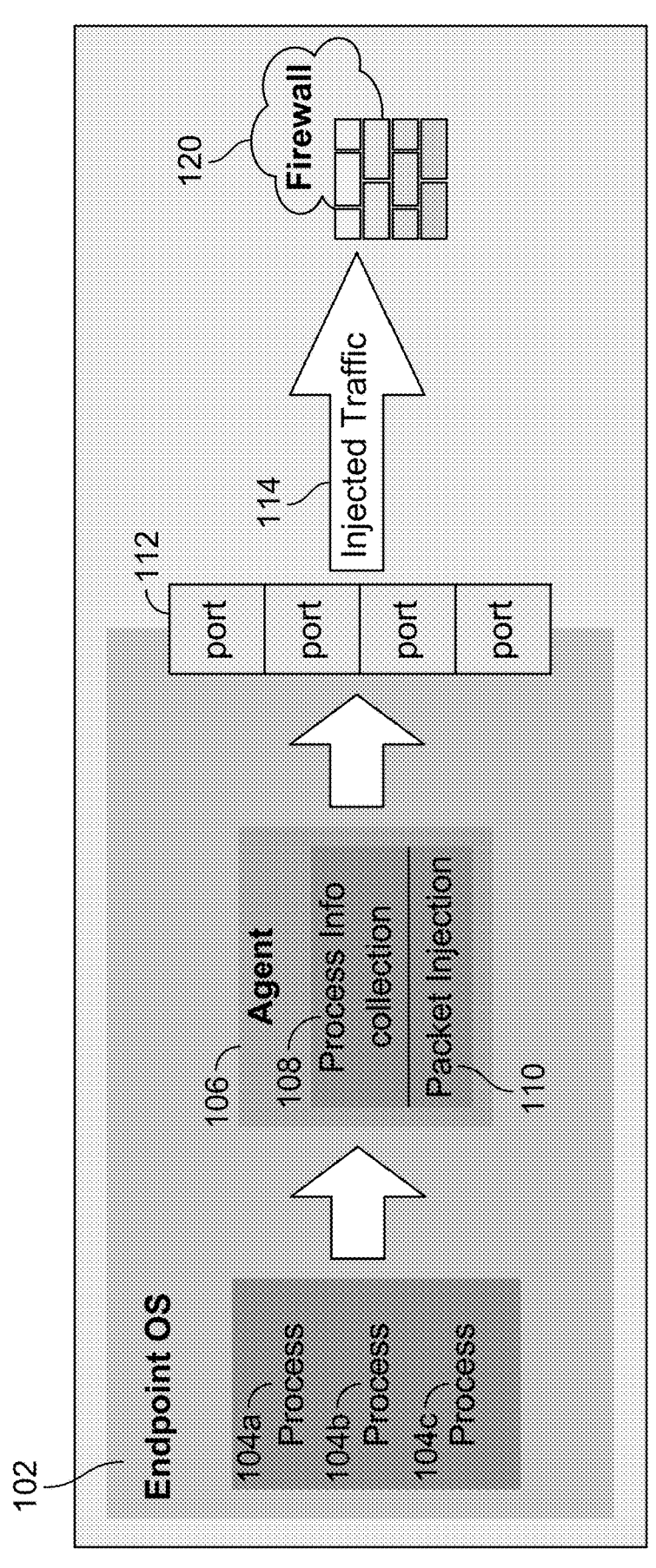
FIG. 1 is a system diagram of an architecture for providing application context via endpoint-aware traffic for enhanced security in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls, which can also be implemented using SD-WAN devices).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Overview of Techniques for Application Context Via Endpoint-Aware Traffic for Enhanced Security Technical and security challenges with context for endpoint associated network traffic for providing security exist.

Existing security solutions that are available from Palo Alto Networks, Inc, headquartered in Santa Clara, CA, utilize application identification (App-ID) of monitored network traffic to facilitate providing various security services (e.g., security enforcement based on a security policy/rule (s), zero trust network access (ZTNA), etc.). For example, App-ID can be utilized for security policy enforcement for monitored network traffic (e.g., sessions) at a network gateway firewall (NGFW).

Moreover, numerous downstream functions depend on the accuracy of the determined App-ID for a given session. In an example implementation of the App-ID phase, a collection of predefined application (app) signatures (e.g., traffic-pattern matching of network traffic to identify a specific application, which can be based on one or more of the following: strings, IP protocol, packet length, and/or port number) are used to match each traffic session and identify it as a specific application. In recent years, this traffic-pattern-based App-ID has held a leading position among firewall competitors who have sought to replicate this approach and design in their firewalls.

However, as the Internet continues to rapidly evolve, applications have become increasingly complex and unpredictable, leading to limitations in the existing App-ID framework (e.g., that utilizes traffic-pattern matching of network traffic to identify a specific application). For example, extracting reliable patterns for an application has become a significant challenge, hampering our ability to expand application coverage. Also, data leakage poses an issue, as a predetermined number of packets associated with a traffic session (e.g., at least four packets) are forwarded to the destination before the application is identified using the above-described App-ID technology (e.g., using deep packet inspection (DPI)). This presents a dilemma within the current security architecture, as we cannot make decisions without analyzing data packets. Moreover, application dependencies can cause complications. For instance, if Application A requires Application B for login, customers generally must allow both applications, resulting in a less-than-ideal user experience when setting policies. The primary reason causing the above challenges is the inherently limited information provided by the network traffic from which App-ID attempts to identify a specific application. As such, the App-ID technology can be applied to perform automated analysis and make predictions based on the traffic, but we have to sacrifice either accuracy or scalability, which is an undesirable trade-off for App-ID objectives.

As such, new and improved techniques are needed to provide a more accurate and scalable App-ID technology.

Accordingly, new and improved techniques for providing application context via endpoint-aware traffic for enhanced security are disclosed.

In some embodiments, a system, a process, and/or a computer program product for providing application context via endpoint-aware traffic for enhanced security includes collecting process information for a process at an endpoint; injecting the process information as metadata into network traffic associated with the process to generate endpoint-aware traffic; and processing the endpoint-aware traffic at a security platform or a security service to access more comprehensive information about the endpoint environment to apply a security policy based on a contextual application identifier (App-ID).

For example, the security platform and/or the security service can monitor the endpoint-aware traffic, and the security platform can include a firewall, a network gateway firewall (NGFW), and/or another network device, and the security service can include a cloud-based security service. Also, the indicators can be configured on the endpoint to collect the process information at the endpoint using an agent executed on the endpoint. The process information can include a process identifier (PID), a process parent identifier (PPID), and a process name. As such, the endpoint-aware traffic can be processed at the security platform and/or the security service to provide contextual information associated with the network traffic for applying a security policy based on the contextual App-ID.

In an example implementation, the identification of the contextual App-ID is performed prior to a start of a new session associated with network traffic for the new session. As such, the identification of the contextual App-ID prior to the start of the new session reduces risks associated with data leakage by preventing the forwarding of any packets from the new session based on the contextual App-ID and a security policy.

In some embodiments, a system, a process, and/or a computer program product for providing application context via endpoint-aware traffic for enhanced security further includes extracting the process information and automatically grouping a plurality of traffic sessions sharing a common process identifier (PID) and/or a common parent process identifier (PPID) to be associated with a single application. Specifically, the endpoint-aware traffic is processed at the security platform and/or the security service to provide contextual information associated with the network traffic for applying a security policy based on a contextual App-ID for the plurality of traffic sessions. For example, if any of the network traffic within the group matches one or more existing App-ID signatures for identifying an application, then each of the plurality of traffic sessions associated with the group are automatically identified as being associated with the application.

In an example implementation, the disclosed techniques for providing application context via endpoint-aware traffic for enhanced security includes providing the following: (1) endpoint-aware traffic; and (2) contextual App-ID. Both of these new technologies will now be further described below.

Endpoint-aware traffic facilitates providing more accurate information for identifying a specific application associated with network traffic (e.g., a new session for an endpoint). Specifically, to obtain more accurate information, we shift our focus to endpoint devices instead of relying solely on network traffic. By concentrating on process information on the endpoint, we can better understand application behavior as it is naturally contextual with such processes.

More specifically, one or more indicators are configured on the endpoint to collect the process information (e.g., process identifier (PID), parent process identifier (PPID), and process name). The extracted process information is injected as metadata into the corresponding traffic generated by that process. The resulting injected traffic is referred to herein as endpoint-aware traffic. As such, the endpoint-aware traffic can then be processed by a security platform (e.g., a firewall, such as an NGFW, and/or any other network/security entity/device) and/or a security service to access more comprehensive information about the endpoint environment, providing valuable context for the traffic, such as will be further described below.

Contextual App-ID also facilitates more enhanced security. Specifically, the security platform and/or the security service can extract the process information from the endpoint-aware traffic and then group multiple traffic sessions sharing a common PID/PPID into a single application. For example, if any traffic within the group matches the existing App-ID signatures, then the entire group can be identified with the associated specific application. Even in cases where no signature is matched, the process name can still provide useful information to the customer and the security platform to perform further security analysis.

Accordingly, this enhanced App-ID, which encompasses multiple traffic sessions, is referred to herein as contextual App-ID. By examining the relationships between traffic sessions, contextual App-ID enables in-depth analysis for downstream functionalities, such as will be further described below.

The disclosed endpoint-aware traffic provides security platforms/security services with more extensive process information (e.g., depending on the metadata injected into the traffic) than relying solely on network traffic. This approach proves beneficial in the following use cases: (1) application identification; (2) process behavior and threat analysis; and (3) endpoint system analysis, such as will be further described below.

Moreover, the disclosed techniques for providing application context via endpoint-aware traffic for enhanced security also facilitate the following: (1) high scalability: as a common solution utilizing packet injection, it can easily accommodate growing network demands; and (2) high adaptability: it does not require decryption and is NAT friendly, making it compatible with various network configurations, such as will be further described below.

Further, the disclosed contextual App-ID addresses several technical challenges and shortcomings that are prevalent in current App-ID implementations. First, contextual App-ID increases application coverage by eliminating unknown sessions within a known contextual App-ID, providing more accurate identification of specifical applications. Second, contextual App-ID lowers the risk of data leaks by preventing the forwarding of any packets from certain sessions within a known contextual App-ID. Third, contextual App-ID reduces dependency across applications by enabling the allowance or denial of the entire contextual App-ID rather than individual sessions.

Finally, the disclosed techniques for providing application context via endpoint-aware traffic for enhanced security also facilitate the following: (1) the process name can be utilized to further improve on the App-ID signature; (2) even for unknown traffic sessions, contextual App-ID ensures that some information is provided via the injected metadata in the endpoint-aware traffic (e.g., the process name, etc.); and (3) the identification of traffic sessions within a contextual App-ID can be performed/determined prior to the start of a new session (e.g., this ability to predict the specific application (app) is advantageous for many downstream functionalities that rely on early identification), such as will be further described below.

These and other embodiments and examples for providing application context via endpoint-aware traffic for enhanced security will be further described below.

Example System Architectures for Providing Application Context Via Endpoint-Aware Traffic for Enhanced Security As similarly discussed above, a technical challenge for identifying applications based solely on network traffic for security policy control at a security platform and/or a security service is that such application identification may not be able to accurately identify a specific application based solely on the network traffic. Also, there may be a dependency on another application as also similarly described above. Moreover, there can be data leakage as a certain number of packets (e.g., four or more packets) are typically required to pass through the security platform to the destination prior to a potential application identification being determined as also discussed above.

As such, the technical challenges associated with such application identification are a result of a lack of adequate contextual information associated with the network traffic. For example, that a group of sessions are associated with the same application executing on a given endpoint device (e.g., a given application can often generate multiple sessions) would facilitate a more accurate and scalable application identification for security policy control at a security platform and/or a security service, such as similarly described above.

As such, new and improved techniques for providing application context via endpoint-aware traffic for enhanced security will now be further described below.

FIG. 1 is a system diagram of an architecture for providing application context via endpoint-aware traffic for enhanced security in accordance with some embodiments. Referring to FIG. 1, an endpoint (e.g., an endpoint device) executes an operating system (OS) shown as 102. Example endpoints include laptop computers, desktop computers, smartphones, servers, and/or various other network enabled computing devices that can execute one or more applications. As also shown in FIG. 1, the OS can execute multiple different processes that can be associated with a single application or multiple distinct applications, such as shown at 104a, 104b, and 104c.

An agent 106 is also executed on the endpoint OS. The endpoint agent can be provided by a commercially available security agent, such as the Cortex XDR solution that is commercially available from Palo Alto Networks, Inc., and/or another commercially available or publicly available endpoint agent that can monitor process activity on the endpoint can similarly be used for performing the disclosed techniques as further described below.

In this example implementation, the agent 106 is executed on the endpoint OS 102 and monitors/intercepts any traffic that is generated by a given process (e.g., process 104a, 104b, or 104c).

As shown at 108, the agent 106 is configured to collect various process information including, for example, a process identifier (PID), a parent process identifier (PPID), and/or a process name.

As shown at 110, the agent 106 is configured to perform packet injection. Specifically, the collected process information (e.g., PID, PPID, and/or process name) is added as metadata into the packet to generate endpoint-aware traffic, such as will be further described below. The endpoint-aware traffic is then forwarded through a given port as shown at 112, and the injected traffic 114 (i.e., endpoint-aware traffic) can then be intercepted by a security platform, shown as firewall 120 in FIG. 1.

As such, the endpoint-aware traffic can then be processed by a security platform (e.g., a firewall, such as an NGFW, and/or any other network/security entity/device) and/or a security service to access more comprehensive information about the endpoint environment, providing valuable context for the traffic, such as will be further described below.

Figure 2:
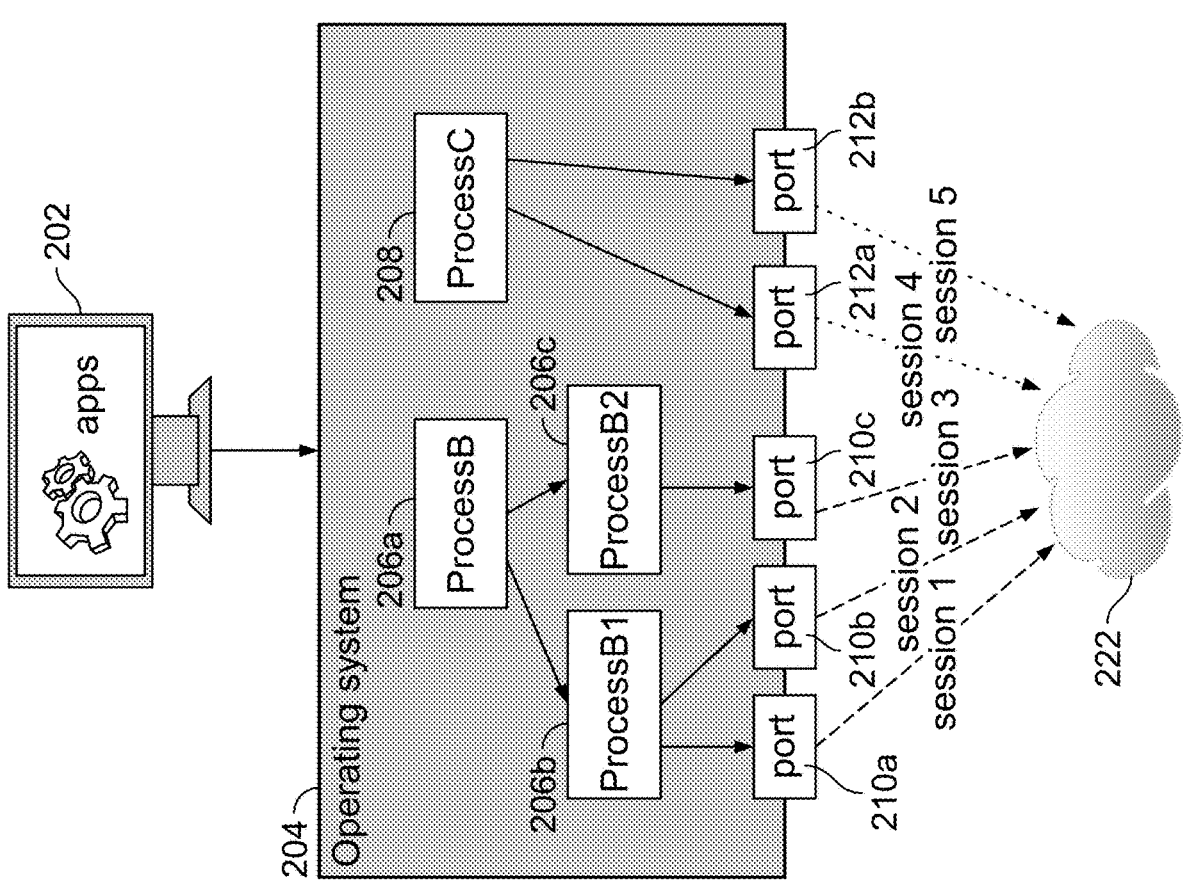
FIG. 2 illustrates an application process tree that can be monitored to provide contextual information for providing application context via endpoint-aware traffic for enhanced security in accordance with some embodiments.

FIG. 2 illustrates an application process tree that can be monitored to provide contextual information for providing application context via endpoint-aware traffic for enhanced security in accordance with some embodiments.

Referring to FIG. 2, various applications (apps) 202 are executed on an operating system (OS) 204 of an endpoint. As similarly described above, contextual information is carried by process information. As such, the disclosed techniques collected the process information associated with various network activities (e.g., sessions) and injected such as metadata into the network traffic to facilitate generating endpoint-aware traffic, such as similarly described above with respect to FIG. 1.

Specifically, for the App level, the network traffic generated by a given application is sent by a process tree (e.g., identified by root process node PID), which is referred to herein as a contextual group. As shown in FIG. 2, a ProcessB 206a is a root process node (e.g., or a parent process, which can have, for example a PID=10 and a PPID=1) that has two child processes shown as ProcessB1 206b (e.g., which can have, for example, a PID=11 and a PPID=1) and ProcessB2 206c (e.g., which can have, for example, a PID=12 and a PPID=1). ProcessC 208 (e.g., which can have, for example, a PID=21 and a PPID=2) does not include any child processes as shown in FIG. 2. As such, these multiple processes effectively form a tree structure connected by the process identifier (PID) and parent process identifier (PPID) as shown in FIG. 2. As is also apparent from FIG. 2, a port cannot be held by multiple processes at the same time.

For the functional app level, the application generated network traffic is sent by a process (e.g., each identified by each unique PID or PPID in the tree), which is referred to herein as a contextual group. As also shown in FIG. 2, the application generated traffic associated with the contextual group for ProcessB1 206b is sent out on port 210a for session 1 and on port 210b for session 2 and for ProcessB2 206c is sent out on port 210c for session 3. Also, the application generated traffic associated with the contextual group for ProcessC 208 is sent out on port 212a for session 4 and on port 212b for session 5. The session traffic is sent out to an Internet destination as shown at 222 in this example (e.g., Software-as-a-Service (SaaS) application sites, such as for a Zoom communication application, a Google or Microsoft office productivity application, a Salesforce sales related application, etc.).

Figure 3:
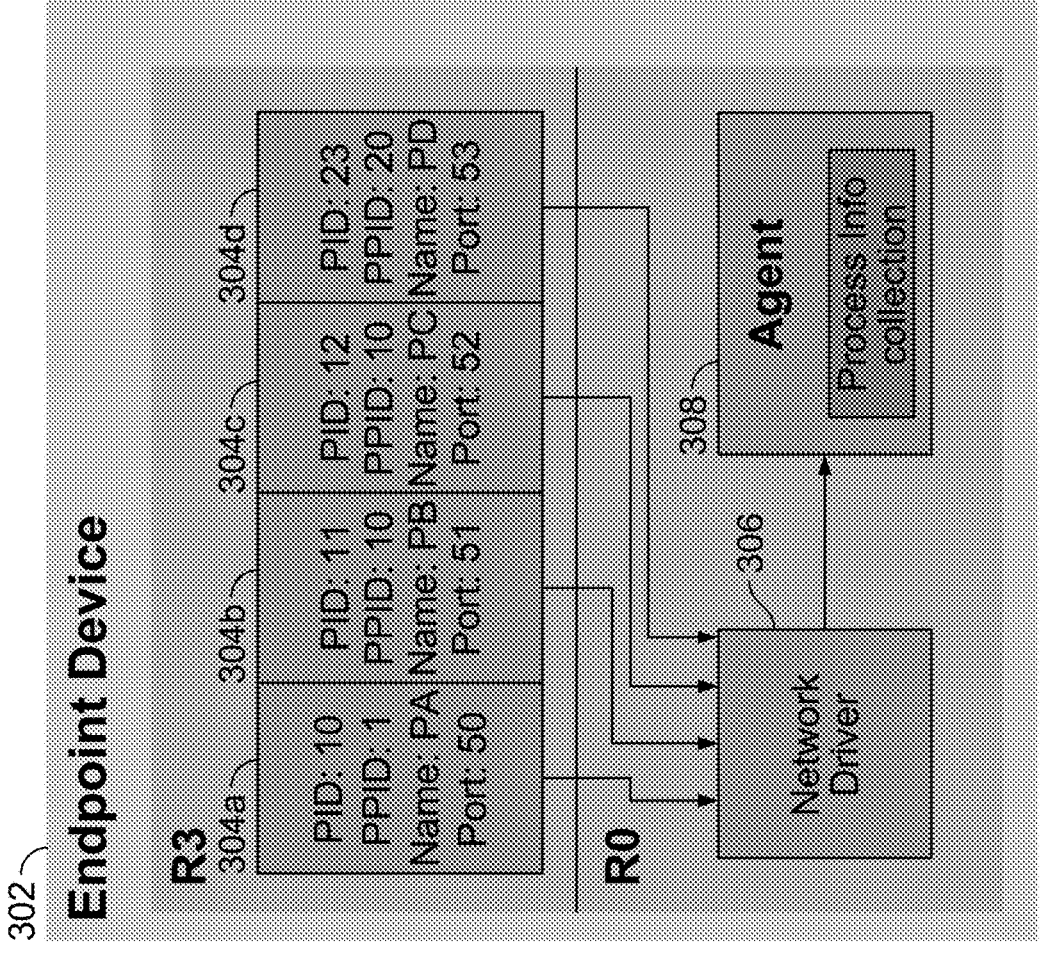
FIG. 3 illustrates a framework for process information collection to provide contextual information for providing application context via endpoint-aware traffic for enhanced security in accordance with some embodiments.

FIG. 3 illustrates a framework for process information collection to provide contextual information for providing application context via endpoint-aware traffic for enhanced security in accordance with some embodiments.

Referring to FIG. 3, as shown at the R3 level, the process information is collected by each source port. Specifically, an endpoint device 302 includes multiple distinct processes (e.g., executing on the OS executed on the endpoint), which are shown at 304a, 304b, 304c, and 304d. As also shown, each process includes the following information: (1) a PID; (2) a PPID; (3) a process name; and (4) a port number.

As also shown in FIG. 3, at the R0 level, the R3 information is monitored when traffic is being sent out from the endpoint. Specifically, an endpoint agent 308 collects the process information using a network deriver 306. Specifically, the agent collects process information according to the network activities, which can include the following Process Information: (1) Process ID (PID); (2) Parent Process ID (PPID); (3) Process Name; and (4) Port Number. The agent can also be configured to collect other process behavior if needed.

Figure 4:
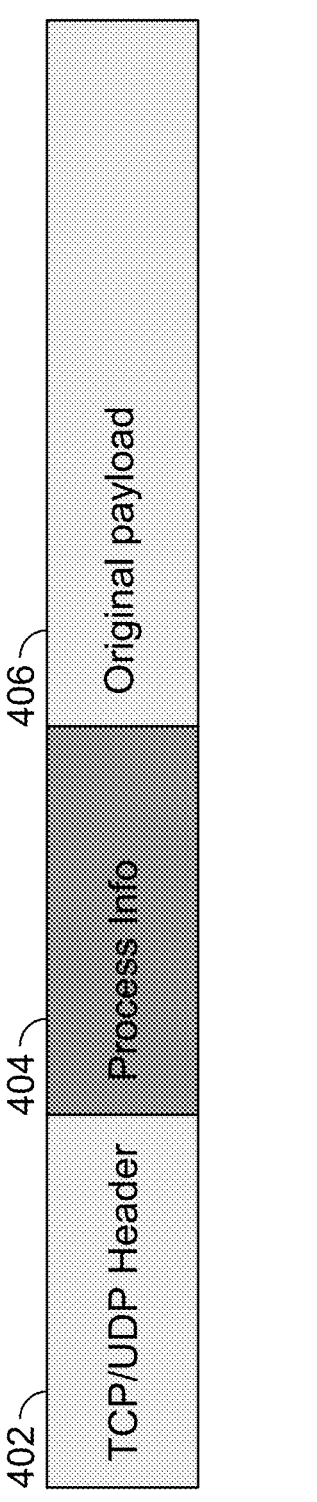
FIG. 4 is an example packet injection of process information providing application context via endpoint-aware traffic for enhanced security in accordance with some embodiments.

FIG. 4 is an example packet injection of process information providing application context via endpoint-aware traffic for enhanced security in accordance with some embodiments.

Referring to FIG. 4, to leverage the collected process information, an endpoint agent (e.g., as shown at 106 in FIG. 1 and/or as shown at 308 in FIG. 3) appends the collected process information, after a TCP/UDP Header 402, as metadata process information 404 (e.g., PID, PPID, process name, and/or other information associated with the endpoint), and before an original payload 406, into a network packet. As such, a security platform (e.g., firewall 120 as shown in FIG. 1) and/or other service (e.g., a cloud-based security service, such as Prisma Access, which is commercially available from Palo Alto Networks, Inc., headquartered in Santa Clara, CA, or other security service) can parse and extract the process information metadata from the network packet (e.g., endpoint-aware traffic).

In an example implementation, the collected process information is appended to a network packet for a new session once per session. Also, in some implementations, the metadata injected into the network packet to generate endpoint-aware traffic can include additional metadata associated with the endpoint. For example, additional metadata can include a MAC address for the endpoint and/or other hardware/software related information associated with the endpoint (e.g., Host Information Profile (HIP), device name, OS and version, security profile, etc.).

Also, the collected process information that is extracted at the security platform and/or the security service as similarly described above can also be used for contextual grouping of sessions, such as further described below with respect to FIG. 5.

FIG. 5 is an example grouping of sessions using collected process information for providing application context via endpoint-aware traffic for enhanced security in accordance with some embodiments.

In this example implementation, a contextual grouping service is provided to collect firewall sessions (e.g., communicating with an agent service via HTTP or another networking protocol). Specifically, an endpoint agent (e.g., as shown at 106 in FIG. 1 and/or as shown at 308 in FIG. 3) is configured to collect contextual (process) information and inject the collected contextual information into the network traffic (e.g., a network packet, such as similarly described above with respect to FIG. 4) for the new session generated by the process executed on the endpoint, such as similarly described above with respect to FIGS. 1-4. The process information (e.g., injected metadata) is extracted from the endpoint-aware traffic (e.g., the network packet with the injected metadata that includes the collected process information and/or other endpoint related information) at the security platform and/or the service as similarly described above can be used for contextual grouping of sessions to facilitate the disclosed contextual App-ID. As such, the contextual information is extracted from the metadata portion of the network packet. The extracted process information (e.g., PID, PPID, process name, port, etc.) can then be automatically analyzed to group traffic sessions by a specific application, such as shown in FIG. 5.

Referring to FIG. 5, the collected process information for multiple distinct processes, port numbers as well as other session related information (e.g., destination (dst) IP address and network protocol (proto), and App-ID (e.g., SSL, slack-base, etc.)) are analyzed to associate the multiple distinct processes with a specific application for providing the contextual App-ID, such as for a Slack application as shown at 502, for a WeChat application as shown at 504, and for a Zoom application as shown at 506.

Use Cases and Experiment Results

Various use cases and experiment results illustrate the improved accuracy provided by performing the disclosed techniques for providing application context via endpoint-aware traffic for enhanced security.

For example, experiments for testing the disclosed techniques for providing application context via endpoint-aware traffic for enhanced security for identifying various applications, such as Zoom, Microsoft OneDrive, Microsoft Office 365, and Spotify, resulted in significantly improved coverage of App-IDs (e.g., approximately ranging from 16% up to 300% improvements in previous identifications of such applications) (i.e., using prior App-Id network session-only related pattern-matching as discussed above), such as further described below.

Referring to testing to identify Zoom related sessions, which can include zoom-base, zoom-meeting, web-browsing, SSL, zoom-downloading, incomplete, QUIC, etc., only 86.05% of a session group could be identified previously.

Referring to testing to identify Microsoft OneDrive related sessions, which can include SSL, ms-onedrive-business, ms-onedrive-base, etc., only 33.33% of a session group could be identified previously.

Referring to testing to identify Microsoft Office 365 related sessions, which can include SSL, outlook-web-online, QUIC, and sharepoint-online, only 41.93% of a session group could be identified previously.

Referring to testing to identify Spotify related sessions, which can include SSL, Spotify, and google-base, only 23.52% of a session group could be identified previously.

As such, the disclosed techniques for providing application context via endpoint-aware traffic for enhanced security resulted in significantly improved coverage of the App-ID (e.g., approximately ranging from 16% up to 300% improvements in the above-described previous identification percentages of such applications (i.e., using prior App-Id network session-only related pattern-matching as discussed above)).

Also, the applied techniques effectively solve the above-described session dependency problem by performing the above-described grouping of sessions based on the collected process information to associate the grouped sessions with a specific application using the contextual App-ID as similarly described above.

Moreover, the applied techniques effectively decrease the data leakage technical challenge as such sessions can be accurately identified using the collected process information injected into the initial network packet for each new session as also similarly described above.

Additional example processes for the disclosed techniques for providing application context via endpoint-aware traffic for enhanced security will be further described below.

Example Process Embodiments for Providing Application Context via Endpoint-Aware Traffic for Enhanced Security FIG. 6 is a flow diagram for a process for providing application context via endpoint-aware traffic for enhanced security in accordance with some embodiments. In some embodiments, a process as shown in FIG. 6 is performed by the architecture for providing application context via endpoint-aware traffic for enhanced security and techniques as similarly described above including the embodiments described above with respect to FIGS. 1-5.

At 602, process information for a process is collected at an endpoint. For example, an endpoint agent can be configured to collect the process information (e.g., PID, PPID, process name, etc.), such as similarly described above with respect to FIGS. 1-3.

At 604, the process information is injected as metadata into network traffic associated with the process to generate endpoint-aware traffic. For example, an endpoint agent can be configured to inject the process information into a network packet, such as similarly described above with respect to FIG. 4.

At 606, the endpoint-aware traffic is processed at a security platform or a security service to access more comprehensive information about the endpoint environment to apply a security policy based on a contextual application identifier (App-ID). For example, the endpoint-aware traffic can be processed by a security platform (e.g., a firewall, such as an NGFW, and/or any other network/security entity/device) and/or a security service (e.g., a cloud-based security service) to access more comprehensive information about the endpoint environment, providing valuable context for the traffic (e.g., contextual App-ID), such as similarly described above with respect to FIGS. 1-4.

FIG. 7 is another flow diagram for a process for providing application context via endpoint-aware traffic for enhanced security in accordance with some embodiments. In some embodiments, a process as shown in FIG. 7 is performed by the architecture for providing application context via endpoint-aware traffic for enhanced security and techniques as similarly described above including the embodiments described above with respect to FIGS. 1-5.

At 702, process information for a process is collected at an endpoint. For example, an endpoint agent can be configured to collect the process information (e.g., PID, PPID, process name, etc.), such as similarly described above with respect to FIGS. 1-3.

At 704, the process information is injected as metadata into network traffic associated with the process to generate endpoint-aware traffic. For example, an endpoint agent can be configured to inject the process information into a network packet, such as similarly described above with respect to FIG. 4.

At 706, the endpoint-aware traffic is processed at a security platform or a security service to access more comprehensive information about the endpoint environment to apply a security policy based on a contextual application identifier (App-ID). For example, the endpoint-aware traffic can be processed by a security platform (e.g., a firewall, such as an NGFW, and/or any other network/security entity/device) and/or a security service (e.g., a cloud-based security service) to access more comprehensive information about the endpoint environment, providing valuable context for the traffic (e.g., contextual App-ID), such as similarly described above with respect to FIGS. 1-4.

At 708, grouping of sessions using the extracted process information is performed. For example, a plurality of sessions can be grouped into a contextual App-ID based on the extracted process information, such as similarly described above with respect to FIG. 5.

At 710, an action is performed using a contextual App-ID based on the security policy. For example, a session can be allowed, blocked, dropped, monitored, or logged, an associated endpoint can be quarantined, and/or another action can be performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
    collect process information for a process at an endpoint;
    inject the process information as metadata into network traffic associated with the process to generate endpoint-aware traffic;
    extract the process information and automatically group a plurality of traffic sessions sharing a common process identifier (PID) and/or a common parent process identifier (PPID) to be associated with a single application; and
    process the endpoint-aware traffic at a security platform or a security service to access more comprehensive information about the endpoint to apply a security policy based on a contextual application identifier (App-ID), wherein the endpoint-aware traffic is processed at the security platform and/or the security service to provide contextual information associated with the network traffic for applying a security policy based on a contextual App-ID for the plurality of traffic sessions; and
a memory coupled to the processor and configured to provide the processor with instructions.

2. The system of claim 1, wherein the security platform includes a firewall, a network gateway firewall (NGFW), and/or another network device, and wherein the security service includes a cloud-based security service.

3. The system of claim 1, wherein the security platform and/or the security service monitors the endpoint-aware traffic, and wherein the security platform includes a firewall, a network gateway firewall (NGFW), and/or another network device, and wherein the security service includes a cloud-based security service.

4. The system of claim 1, wherein indicators are configured on the endpoint to collect the process information at the endpoint using an agent executed on the endpoint.

5. The system of claim 1, wherein indicators are configured on the endpoint to collect the process information at the endpoint, and wherein the process information includes a process identifier (PID), a process parent identifier (PPID), and a process name.

6. The system of claim 1, wherein the endpoint-aware traffic is processed at the security platform and/or the security service to provide contextual information associated with the network traffic for applying the security policy.

7. The system of claim 1, wherein the endpoint-aware traffic is processed at the security platform and/or the security service to provide contextual information associated with the network traffic for applying the security policy based on the contextual App-ID.

8. The system of claim 1, wherein identification of the contextual App-ID is performed prior to a start of a new session associated with network traffic for the new session, and wherein the identification of the contextual App-ID prior to the start of the new session reduces risks associated with data leakage by preventing a forwarding of any packets from the new session based on the contextual App-ID and the security policy.

9. The system of claim 1, wherein the processor is further configured to:

wherein if any of the network traffic within the group matches one or more existing App-ID signatures for identifying an application, then each of the plurality of traffic sessions associated with the group are automatically identified as being associated with the application.

10. A method, comprising:

collecting process information for a process at an endpoint;

injecting the process information as metadata into network traffic associated with the process to generate endpoint-aware traffic;

extracting the process information and automatically group a plurality of traffic sessions sharing a common process identifier (PID) and/or a common parent process identifier (PPID) to be associated with a single application; and processing the endpoint-aware traffic at a security platform or a security service to access more comprehensive information about the endpoint to apply a security policy based on a contextual application identifier (App-ID), wherein the endpoint-aware traffic is processed at the security platform and/or the security service to provide contextual information associated with the network traffic for applying a security policy based on a contextual App-ID for the plurality of traffic sessions.

11. The method of claim 10, wherein indicators are configured on the endpoint to collect the process information at the endpoint using an agent executed on the endpoint.

12. The method of claim 10, wherein indicators are configured on the endpoint to collect the process information at the endpoint, and wherein the process information includes a process identifier (PID), a process parent identifier (PPID), and a process name.

13. The method of claim 10, wherein the endpoint-aware traffic is processed at the security platform and/or the security service to provide contextual information associated with the network traffic for applying the security policy.

14. The method of claim 10, wherein the endpoint-aware traffic is processed at the security platform and/or the security service to provide contextual information associated with the network traffic for applying the security policy based on the contextual App-ID.

15. The method of claim 10, wherein identification of the contextual App-ID is performed prior to a start of a new session associated with network traffic for the new session, and wherein the identification of the contextual App-ID prior to the start of the new session reduces risks associated with data leakage by preventing a forwarding of any packets from the new session based on the contextual App-ID and the security policy.

16. The method of claim 10, wherein if any of the network traffic within the group matches one or more existing App-ID signatures for identifying an application, then each of the plurality of traffic sessions associated with the group are automatically identified as being associated with the application.

17. A computer program product embodied in a non-transitory computer readable medium and comprising computer instructions for:

collecting process information for a process at an endpoint;

injecting the process information as metadata into network traffic associated with the process to generate endpoint-aware traffic;

extracting the process information and automatically group a plurality of traffic sessions sharing a common process identifier (PID) and/or a common parent process identifier (PPID) to be associated with a single application; and processing the endpoint-aware traffic at a security platform or a security service to access more comprehensive information about the endpoint to apply a security policy based on a contextual application identifier (App-ID), wherein the endpoint-aware traffic is processed at the security platform and/or the security service to provide contextual information associated with the network traffic for applying a security policy based on a contextual App-ID for the plurality of traffic sessions.

18. The computer program product of claim 17, wherein indicators are configured on the endpoint to collect the process information at the endpoint using an agent executed on the endpoint.

19. The computer program product of claim 17, wherein the endpoint-aware traffic is processed at the security platform and/or the security service to provide contextual information associated with the network traffic for applying the security policy based on the contextual App-ID.

20. The computer program product of claim 17, wherein identification of the contextual App-ID is performed prior to a start of a new session associated with network traffic for the new session, and wherein the identification of the contextual App-ID prior to the start of the new session reduces risks associated with data leakage by preventing a forwarding of any packets from the new session based on the contextual App-ID and the security policy.

21. The computer program product of claim 17, wherein if any of the network traffic within the group matches one or more existing App-ID signatures for identifying an application, then each of the plurality of traffic sessions associated with the group are automatically identified as being associated with the application.

* * * * *